United States Patent [19]

Matsumoto et al.

[11] Patent Number: 4,808,564
[45] Date of Patent: Feb. 28, 1989

[54] CATALYST FOR THE PURIFICATION OF EXHAUST GASES

[75] Inventors: Shinichi Matsumoto, Aichi; Naoto Miyoshi, Nagoya; Masayasu Sato, Osaka, all of Japan

[73] Assignee: Toyota Jidosha Kabushiki Kaisha, Aichi, Japan

[21] Appl. No.: 129,850

[22] Filed: Dec. 8, 1987

[30] Foreign Application Priority Data

Dec. 24, 1986 [JP] Japan ................................. 61-310638

[51] Int. Cl.$^4$ ..................... B01J 21/04; B01J 23/10; B01J 32/00
[52] U.S. Cl. ................................. 502/303; 423/213.5
[58] Field of Search ..................... 502/303; 423/213.5

[56] References Cited

U.S. PATENT DOCUMENTS

| | | | |
|---|---|---|---|
| 3,003,020 | 10/1961 | Miller | 174/84 |
| 3,951,860 | 4/1976 | Acres et al. | 252/432 |
| 4,170,573 | 10/1979 | Ernest et al. | 252/462 |
| 4,528,279 | 7/1985 | Suzuki et al. | 502/303 X |
| 4,591,580 | 5/1986 | Kim et al. | 502/303 |

*Primary Examiner*—W. J. Shine
*Attorney, Agent, or Firm*—Finnegan, Henderson, Farabow, Garrett & Dunner

[57] ABSTRACT

A catalyst for the purification of exhaust gases capable of maintaining excellent durability at elevated temperatures and preventing the formation of LaAlO$_3$, comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to the total rare earth atoms is 0.05 to 0.20, and the ratio of the member of the total rare earth atoms to the number of aluminum atoms is 0.05 to 0.25.

6 Claims, No Drawings

CATALYST FOR THE PURIFICATION OF EXHAUST GASES

BACKGROUND OF THE INVENTION

1. Field of the Invention

This invention relates to a catalyst for the purification of exhaust gases capable of purifying exhaust gases from internal combustion engines such as automotive engines by removing carbon monoxide (CO), hydrocarbon (HC) and nitrogen oxides (NOx).

2. Prior Art

As a conventional catalyst for the purification of automobile exhaust gases, there has generally been known a catalyst comprising a support substrate, a catalyst carrier layer formed on the surface of the support substrate and catalyst ingredients carried on the catalyst carrier layer, and so far, there have been demonstrated various kinds of catalysts for the purificaion exhaust gases aiming at efficient purification.

For example, some techniques using cerium have been disclosed in Japanese Examined Patent Publication (KOKOKU) Nos. 20307/1983 and 41775/1984 and Japanese Unexamined Patent Publication (KOKAI) No. 90695/1984. In the catalysts of these techniques using cerium, cerium is present in the oxide form. The cerium improves the purification property by discharging or storing oxygen (oxygen storing capability) according to the reaction shown in formula (1) and by controlling the oxidation of CO and HC, and the reduction of NOx.

$$CeO_2 \rightleftharpoons CeO_{2-x} + (x/2)O_2 \qquad (1)$$

It has been known that the reaction shown in formula (1) occurs on the surface of the cerium oxide particles. However, in the aforesaid conventional catalysts for the purification of exhaust gases, the total surface area of the cerium oxide particles was reduced by the growth of the cerium oxide particles when the conventional catalysts were used at elevated temperatures 800° C. or more. Accordingly, there has arised a disadvantage that the purification property is degraded due to the deterioration of the oxygen storing capability.

Also, some techniques using other rare earth and transition metals simultaneously with cerium for aiming at stabilization of activated alumina, were disclosed in Japanese Examined Patent Publication (KOKOKU) No. 7537/1985, Japanese Unexamined Patent Publication (KOKAI) Nos. 18180/1973, 63133/1982 87839/1982, U.S. Pat. No. 3,003,020, U.S. Pat. No. 3,951,860 and U.S. Pat. No. 4,170,573. For example, techniques disclosed in Japanese Examined Patent Publication (KOKOKU) No. 7537/1985 and Japanese Unexamined Patent Publication (KOKAI) No. 63133/1982 have used cerium with lanthanum (La) and formed a composite oxide shown in formula (2).

$$Ce_{1-x} La_x O_{2-(x/2)} \qquad (2)$$

$$(0.3 \leq X \leq 0.5)$$

In the catalysts for the purification of exhaust gases of the above techniques, a lattice defect with oxygen vacancies is formed in the fluorite structure of the composite oxide, so that the oxygen storing capability having durability can be achieved.

However, in those catalysts for the purification of exhaust gases, lanthanum forms $LaAlO_3$ at elevated temperatures, particularly at over 800° C. Therefore, a surface area of alumina catalyst carrier layer is reduced and transformed by the $LaAlO_3$ formation. Further, the growth of catalyst ingredient particles arises. Consequently, there have arisen disadvantages that the efficiency of purification is deteriorated. In short, those catalysts have showed poor durability at elevated temperatures.

In U.S. Pat. No. 4,170,573, a catalyst having durability at elevated temperatures is obtained by carrying catalyst ingredients after heating a catalyst support having a catalyst carrier layer comprising cerium and lanthanum at elevated temperatures 983 to 1317° C. However, this catalyst has not shown the sufficient durability at elevated temperatures since the formation of $LaAlO_3$ is not prevented and the surface area is reduced.

SUMMARY OF THE INVENTION

Accordingly, it is an object of this invention to provide a catalyst for the purification of exhaust gases having an excellent durability at elevated temperatures in which the $LaAlO_3$ formation at elevated temperatures is prevented and the properties of cerium and lanthanum oxides are prevented.

In the catalyst for the purification of exhaust gases of this invention, the catalyst carrier layer comprises oxides of cerium and lanthanum in which the molar fraction of lanthanum atoms to the total rare earth atoms is 0.05 to 0.20 and the ratio of the number of the total rare earth atoms to the number of aluminum atoms is 0.05 to 0.25. Thus, the oxides of cerium and lanthanum are generally present as composite oxide and the growth of cerium oxide particles is suppressed. The crystal structure of the composite oxide has a lattice defect with oxygen vacancies. Therefore, the oxygen mobility within the composite oxide crystal is facilitated and the high oxygen storing capability is ensured.

Further, the formation of $LaAlO_3$ is prevented by fixing the composition of each atom in the aforesaid range and the durability at elevated temperatures is enhanced remarkably since the surface area is not reduced. That is, it becomes possible to ensure excellent durability at elevated temperatures and excellent purification performance for a long period according to the present invention.

DATAILED DESCRIPTION OF THE INVENTION

The catalyst for the purification of exhaust gases of this invention comprises a support substrate, a catalyst carrier layer formed on the surface of said support substrate and catalyst ingredients carried on said catalyst carrier layer. The catalyst carrier layer comprises oxides of lanthanum and cerium and the molar fraction of lanthanum atom to the total rare earth atoms is 0.05 to 0.20 and the ratio of the number of the total rare earth atoms to the number of aluminum atoms (the number of the total rare earth atoms/the number of aluminum atoms) is 0.05 to 0.25.

For the support substrate, a conventional substrate such as honeycomb-shape monolithic support substrate and a pellet-shape support substrate, can be used. For the material of the support substrate, well known ceramics such as cordierite, mullite, alumina, magnesia and spinel or well known heat resistant metals such as ferritic steel, can be used.

For the catalyst carrier layer carrying the catalyst ingredients thereon, activated alumina having a large specific surface area can be used as a principal component. Zirconia, titanium oxide and the like can also be used for the catalyst carrier layer, however, gamma-alumina and theta-alumina are generally used.

The best feature of this invention is the catalyst carrier layer comprising lanthanum and cerium oxides in which the molar fraction of lanthanum atoms to the total rare earth atoms is 0.05 to 0.20 and the ratio of the number of the total rare earth atoms to the number of aluminum atoms (the number of the total rare earth atoms/the number of aluminum atoms) is 0.05 to 0.25.

The growth of cerium oxide particles is facilitated if the cerium is present in the single oxide form. For example, our research has demonstrated that the cerium oxide particles increase up to about 0.1 $\mu$m in diameter when heated at 1000° C.

Accordingly, even if the removal of carbon monoxide (CO) is performed according to reaction formula (3) after heating at 1000° C., the reaction rate becomes almost zero and the oxygen storing capability decreases remarkably.

$$CO + CeO_2 \rightarrow CO_2 + CeO_2 \quad (3)$$

It is well known that the composite oxide comprising lanthanum and cerium prevents the above mentioned disadvantage, however, there arises another disadvantage that the lanthanum forms $LaAlO_3$ at elevated temperatures and the durability at elevated temperatures decreases.

We have continued our research and completed this invention by discovering that the excellent durability at elevated temperatures can be achieved by containing aluminum, cerium and lanthanum in the aforementioned ratios in the catalyst carrier layer.

The catalyst carrier layer contains oxides of cerium and lanthanum. Also, the catalyst carrier layer may contain the oxide of other rare earth elements selected from the group consisting of yttrium (Yt), scandium (Sc), neodymium (Nd), praseodymium (Pr), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

The catalyst carrier layer includes rare earth atoms in which the molar fraction of lanthanum atoms to the total rare earth atoms is 0.05 to 0.20. If the molar fraction is less than 0.05, the sufficient effect of the lanthanum cannot be expected and therefore the growth of cerium oxide particles occurs. On the other hand, if it exceeds 0.20, the formation of $LaAlO_3$ is facilitated and therefore the durability at elevated temperatures is deteriorated. Accordingly, it is preferred that the molar fraction falls in a range of 0.07 to 0.15.

In addition to the above molar fraction, the ratio of the number of the total rare earth atoms to the number of aluminum atoms (the number of the total rare earth atoms/ the number of aluminum atoms) is 0.05 to 0.25 in the catalyst carrier layer. If the ratio is less than 0.05, the sufficient effect of the rare earths cannot be expected and therefore the purification performance is deteriorated. On the other hand, if it exceeds 0.25, the formation of $LaAlO_3$ is facilitated and the surface area of the carrier layer is reduced since oxides of rare earth atoms fill pores of alumina. Therefore, the durability at elevated temperatures is deteriorated and the purification efficiency decreases. Accordingly, it is preferred that the ratio falls in a range of 0.08 to 0.15.

Our research has also demonstrated that the most preferable composition of metal atoms composing the catalyst carrier layer is 1.0 to 2.5 mol % of lanthanum, 15 to 30 mol % of cerium and 83.5 to 77.5 mol % of aluminum based on 100 mol % of the total metal atoms.

Oxides of cerium and lanthanum are generally present as composite oxide in the catalyst carrier layer. To form the composite oxide, the catalyst carrier layer is impregnated with aqueous solutions of cerium salt and lanthanum salt simultaneously or separately and calcining at a temperature of 600° C. or more. If the temperature is under 600° C., it is difficult to form the composite oxide and therefore the growth of cerium oxide particles is facilitated. On the other hand, if the temperature is relatively high, the formation of $LaAlO_3$ is facilitated since activated alumina and lanthanum react each other. Thus, it is preferred to perform the calcining in a range of 600° to 900° C.

For the catalyst ingredients carried on the catalyst carrier layer, the conventionally employed catalysts or mixtures thereof can be used, e.g., noble metals such as platinum (Pt), rhodium (Rh), palladium (Pd), iridium (Ir), ruthenium (Ru), osmium (Os) and the like, and base metals such as chromium (Cr), nickel (Ni), vanadium (V), copper (Cu), cobalt (Co), manganese (Mn) and the like.

DETAILED DESCRIPTION OF THE PREFERRED EMBODIMENTS

Now, the present invention will be described with reference to the following operation and comparative examples.

(Operation Example 1 and Comparative Example 1)

In these operation and comparative examples, platinum and rhodium are carried on the cordierite monolithic support substrate.

First, the commercially available activated alumina (the surface area: 100 to 200 m$^2$/g) was impregnated with an aqueous solution of lanthanum nitrate, and dried at 200° C. and calcined at 600° C. in air for 2 hours. Then, thus obtained substance was crushed into a powder with 10 $\mu$m of particle diameter. Secondly, 100 parts by weight of thus obtained powder was added to an aqueous mixture of 100 parts by weight of water and 30 parts by weight of an aqueous solution containing aluminum nitrate by 40 weight % and well stirred to make a slurry. The powder contained lanthanum by 3weight %. A honeycomb-shape cordierite monolithic catalyst support substrate was immersed in the slurry for 1 minute. After being taken out of the slurry, the support substrate was subjected to an air jet to blow off the excessive slurry, dried at 200° C. for 1 hour and then calcined at 600° C. for 2 hours.

Next, the above support substrate having a catalyst carrier layer containing oxide of lanthanum was immersed in an aqueous solution of cerium nitrate. After being taken out of the aqueous solution, the excessive aqueous solution was blown off, and the support substrate was dried at 200° C. and then calcined at 600° C. for 2 hours. The catalyst carrier layer contained cerium oxide by 35 weight %. Then, 1.0 g of platinum (Pt) and 0.2 g of rhodium (Rh) per 1 l of the support substrate were carried on the support substrate. To carry the catalyst ingredients, the support substrate was immersed in distilled water and taken out of the water after the water was well absorbed thereinto. Then, the excessive water was blown off. The support substrate was immersed in an aqueous solution containing dinitrodiammine platinum for 1 hour to have platinum ingredient carried thereon, and then immersed in an aqueous solution containing rhodium chloride for 1 hour to have rhodium ingredient carried thereon. After being taken out of the respective aqueous solution, the excessive water was blown off. Then, the support substrate was dried at 200° C. for 1 hour. In this manner, a catalyst of operation example 1a was obtained.

In the same manner, catalysts of operation examples 1b and 1c and comparative examples 1d to 1f with the composition ratios shown in Table 1 were obtained by varying the composition ratios of lanthanum and cerium. In Table 1, as well as the following Tables, the values of each metal show the number of moles of each metal atom contained in 1g of the support substrate.

Each such catalyst was attached to an exhaust system of a 3liter 6 cylindered in-line engine and subjected to an aging test for 300 hours. In the aging test, 2 kinds of test conditions of catalyst bed temperature=900° C., air-fuel ratio (A/F)=14.0 and catalyst bed temperature=850° C., A/F=14.6, were applied alternately each 30 minutes or 1 hour. After the aging test, each catalyst was attached to the exhaust system of the identical engine and the purification ratio was measured for hydrocarbon (HC), carbon monoxide (CO) and nitrogen oxides (NOx) under the conditions of 2000 rpm, −360 mmHg, A/F=14.6 and inlet gas temperature to the catalytic converter=400° C. The results are shown in Table 1.

TABLE 1

|  |  | carrier layer composition (mol/l) | | | purification ratio (%) | | |
|---|---|---|---|---|---|---|---|
|  |  | La | Ce | Al | HC | CO | NOx |
| operation example | 1a | 0.018 | 0.2 | 2.0 | 83 | 84 | 86 |
|  | 1b | 0.030 | 0.3 | 2.4 | 82 | 86 | 87 |
|  | 1c | 0.025 | 0.3 | 2.8 | 82 | 86 | 88 |
| comparative example | 1d | 0.005 | 0.005 | 2.0 | 77 | 69 | 78 |
|  | 1e | 0.30 | 0.60 | 2.8 | 71 | 78 | 76 |
|  | 1f | 0.052 | 0.147 | 2.4 | 79 | 78 | 82 |

(OPERATION EXAMPLE 2 and COMPARATIVE EXAMPLE 2)

In these operation and comparative examples, metallic honeycomb-shape support substrates were used. A carrier layer was formed on a heat resistant metallic honeycomb-shape support substrate (a corrugate structure constituted of a 50 μm thickness thin plate comprising 5 % of Al, 20% of Cr and the balance of Fe) in the same manner as operation example 1 except that the activated alumina was not impregnated with the aqueous solution of lanthanum nitrate.

Next, the support substrate having the above carrier layer thereon was immersed in an aqueous mixture of cerium nitrate and lanthanum nitrate, and dried and calcined in the same manner as operation example 1. Then, in the same manner as operation example 1, a catalyst of 2a in Table 2 was obtained by having 1.0 g/l of platinum, 1.0 g/l of palladium and 0.3g/l of rhodium carried on the carrier layer. Operation examples 2b and 2c were obtained by varying the composition of lanthanum and cerium. Operation examples 2d to 2f and comparative examples 2g to 2i were obtained by varying the composition of lanthanum and cerium and by having 1.0 g/l of palladium and 0.2 g/l of rhodium carried on the carrier layer. Palladium was carried by immersing the support substrate in an aqueous solution of palladium chrolide and by drying in the same manner as operation example 1. The purification ratios of thus obtained catalysts were measured in the same manner as operation example 1 and the results are shown in Table 2.

TABLE 2

|  |  | carrier layer composition (mol/l) | | | purification ratio (%) | | |
|---|---|---|---|---|---|---|---|
|  |  | La | Ce | Al | HC | CO | NOx |
| operation example | 2a | 0.015 | 0.10 | 2.0 | 84 | 85 | 87 |
|  | 2b | 0.030 | 0.3 | 2.8 | 83 | 87 | 88 |
|  | 2c | 0.035 | 0.3 | 3.6 | 83 | 88 | 89 |
|  | 2d | 0.020 | 0.15 | 2.0 | 83 | 86 | 83 |
|  | 2e | 0.025 | 0.25 | 2.8 | 83 | 87 | 83 |
|  | 2f | 0.030 | 0.30 | 3.6 | 82 | 88 | 82 |
| comparative example | 2g | 0.005 | 0.010 | 2.8 | 76 | 67 | 71 |
|  | 2h | 0.30 | 0.30 | 2.0 | 71 | 76 | 68 |
|  | 2i | 0.065 | 0.184 | 3.0 | 78 | 72 | 73 |

(OPERATION EXAMPLE 3 and COMPARATIVE EXAMPLE 3)

In these operation and comparative examples, other rare earth metals were used together with lanthanum and cerium. Operation examples 3a to 3c and comparative examples 3d to 3e were obtained by using the same activated alumina as operation example 1. The activated alumina was impregnated with an aqueous mixture containing cerium nitrate as well as the mixture of lanthanum nitrate, neodymium nitrate and samarium nitrate mixed in a mole ratio of 1.0:0.3:0.05. The purification ratios of thus obtained catalysts were measured in the same manner as operation example 1 and the results are shown in Table 3.

TABLE 3

|  |  | carrier layer composition (mol/l) | | | purification ratio (%) | | |
|---|---|---|---|---|---|---|---|
|  |  | La+Nd+Sm | Ce | Al | HC | CO | NOx |
| operation example | 3a | 0.020 | 0.30 | 2.0 | 83 | 86 | 86 |
|  | 3b | 0.025 | 0.30 | 2.6 | 83 | 87 | 86 |
|  | 3c | 0.030 | 0.30 | 3.0 | 82 | 87 | 87 |
| comparative example | 3d | 0.005 | 0.005 | 2.2 | 76 | 70 | 76 |
|  | 3e | 0.60 | 0.30 | 2.8 | 71 | 75 | 74 |

The molar fraction of lanthanum atoms to the total rare earth atoms and the ratio of the number of the total rare earth atoms to the number of aluminum atoms in the catalysts of the operation and comparative examples are shown in Table 4.

TABLE 4

|  |  | lanthanum atoms (mol)/ total rare earth atoms (mol) | the number of the total rare earth atoms/the number of aluminum atoms |
|---|---|---|---|
| operation example | 1a | 0.08 | 0.11 |
|  | 1b | 0.09 | 0.14 |
|  | 1c | 0.08 | 0.12 |
|  | 2a | 0.13 | 0.06 |
|  | 2b | 0.09 | 0.12 |
|  | 2c | 0.10 | 0.09 |
|  | 2d | 0.12 | 0.09 |
|  | 2e | 0.09 | 0.10 |
|  | 2f | 0.09 | 0.09 |
|  | 3a | 0.06 | 0.15 |
|  | 3b | 0.08 | 0.13 |
|  | 3c | 0.09 | 0.11 |
| comparative example | 1d | 0.5 | 0.005 |
|  | 1e | 0.33 | 0.32 |
|  | 1f | 0.26 | 0.08 |
|  | 2g | 0.33 | 0.005 |

TABLE 4-continued

| | lanthanum atoms (mol)/ total rare earth atoms (mol) | the number of the total rare earth atoms/the number of aluminum atoms |
|---|---|---|
| 2h | 0.5 | 0.3 |
| 2i | 0.26 | 0.08 |
| 3d | 0.5 | 0.005 |
| 3e | 0.7 | 0.32 |

As can be seen from Tables 1 to 4, the catalysts of the operation examples are superior to those of the comparative examples in the purification ratio. It is apparent that the difference results from the composition of metallic atoms composing the catalyst carrier layer. It is also apparent that the catalyst of this invention has excellent durability at elevated temperatures.

What is claimed is:

1. A catalyst for the purification of exhaust gases, comprising a support substrate, a catalyst carrier layer formed on said support substrate and catalyst ingredients carried on said catalyst carrier layer,
wherein said catalyst carrier comprises alumina and oxides of rare earth elements including oxides of lanthanum and cerium, the molar fraction of lanthanum atoms to the total rare earth atoms is 0.05 to 0.20, and the ratio of the number of the total rare earth atoms to the number of aluminum atoms is 0.05 to 0.25.

2. A catalyst for the purification of exhaust gases as claimed in claim 1,
wherein the composition of metal atoms comprising said catalyst carrier layer is 1.0 to 2.5 mol % of lanthanum, 15 to 30 mol % of cerium and 83.5 to 77.5 mol % of aluminum based on 100 mol % of the total metal atoms.

3. A catalyst for the purification of exhaust gases as claimed in claim 2,
wherein said catalyst carrier layer is formed by calcination at a temperature of 600° to 900° C.

4. A catalyst for the purification of exhaust gases as claimed in claim 1,
wherein said catalyst carrier layer comprises oxides of lanthanum and cerium and said molar fraction of lanthanum atoms to the total rare earth atoms is 0.07 to 0.15.

5. A catalyst for the purification of exhaust gases as claimed in claim 1,
wherein said catalyst carrier layer comprises oxides of lanthanum and cerium and said ratio of the number of the total rare earth atoms to the number of aluminum atoms is 0.08 to 0.15.

6. A catalyst for the purification of exhaust gases as claimed in claim 1,
wherein said catalyst carrier layer comprises oxides of lanthanum, cerium, neodymium and samarium.

* * * * *

UNITED STATES PATENT AND TRADEMARK OFFICE
CERTIFICATE OF CORRECTION

PATENT NO. : 4,808,564

DATED : February 28, 1989

INVENTOR(S) : Shinichi Matsumoto et al.

It is certified that error appears in the above-identified patent and that said Letters Patent is hereby corrected as shown below:

On the title page:

(75) Inventors: change "Osaka" to --Shizuoka--.

(3) Assignee: change "Toyota Jidosha Kabushiki Kaisha, Aichi, Japan" to --Toyota Jidosha Kabushiki Kaisha, Aichi; and Cataler Industrial Co., Ltd, Shizuoka, all of Japan--.

Column 1, line 19, correct "purificaion" to --purification--;

line 50, insert --and-- after "63133/1982".

Column 2, line 49, correct "DATAILED" TO --DETAILED--;

Column 5, line 18, correct "1 g" to --1ℓ--.

Column 7, line 25, insert --layer-- after "carrier".

Signed and Sealed this

Ninth Day of April, 1991

Attest:

HARRY F. MANBECK, JR.

Attesting Officer

Commissioner of Patents and Trademarks